A. H. OLESBERG.
AUTOMATIC LEVELING DEVICE FOR TRIPODS.
APPLICATION FILED FEB. 7, 1913.
1,135,914.
Patented Apr. 13, 1915.
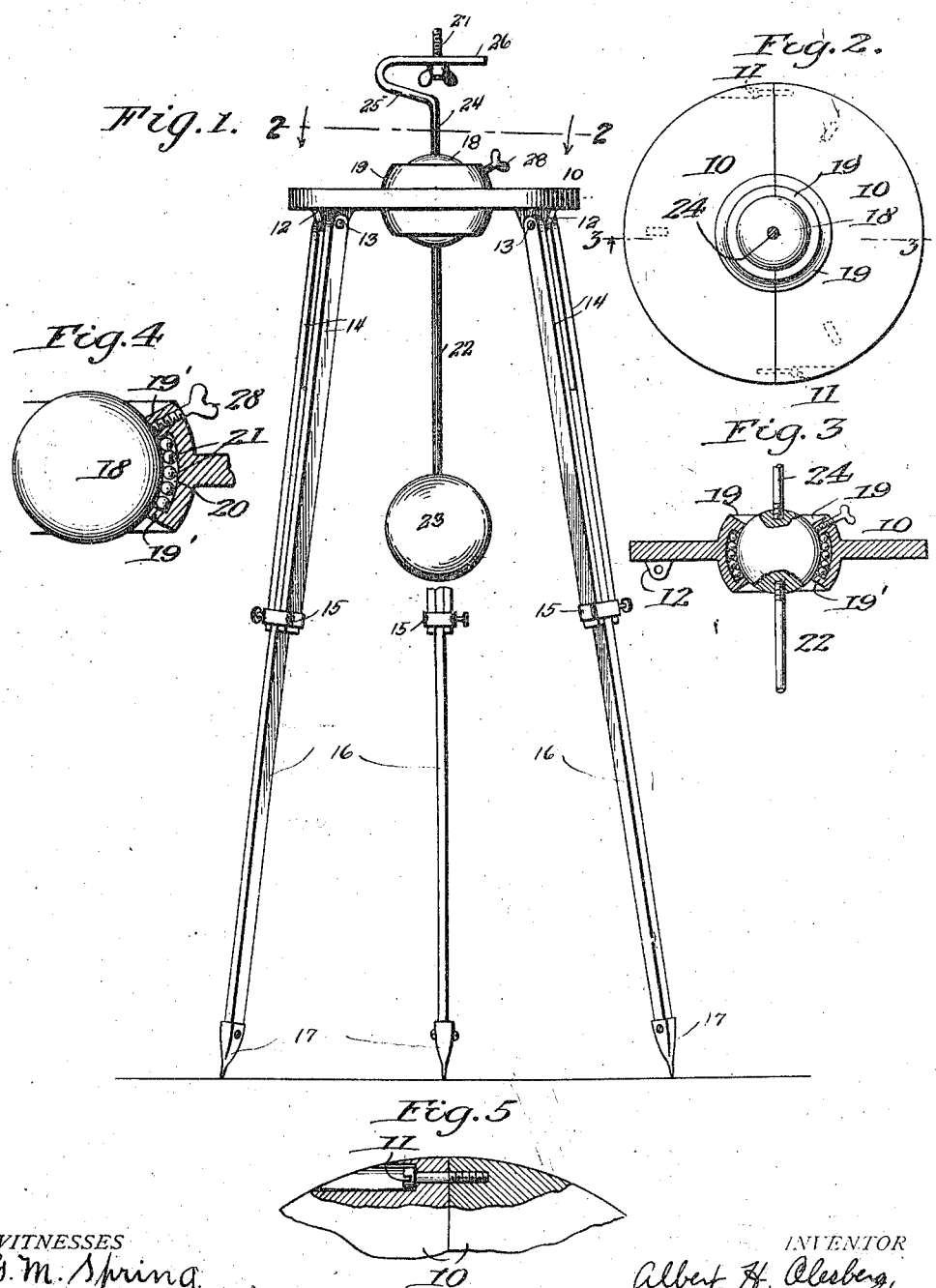

UNITED STATES PATENT OFFICE.

ALBERT H. OLESBERG, OF BAWLF, ALBERTA, CANADA.

AUTOMATIC LEVELING DEVICE FOR TRIPODS.

1,135,914.  Specification of Letters Patent.  Patented Apr. 13, 1915.

Application filed February 7, 1913. Serial No. 746,910.

*To all whom it may concern:*

Be it known that I, ALBERT H. OLESBERG, a citizen of Canada, residing at Bawlf, Province of Alberta, Dominion of Canada, have invented new and useful Improvements in Automatic Leveling Devices for Tripods, of which the following is a specification.

This invention relates to a leveling device designed for use in conjunction with tripods, and includes an instrument supporting bracket in correlation with a revoluble bearing and weighted means for automatically operating said bearing.

The prime object of my invention is to provide, in conjunction with a tripod, automatic leveling means, thus allowing measuring instruments to be normally held in a correct horizontal plane.

Another object of this device is to provide an automatic adjusting contrivance, designed to be used in conjunction with an ordinary surveyor's instrument, so that the latter may be automatically brought into a horizontal plane without the use of other indicating devices.

A further object of the present device is to provide in conjunction with a tripod an automatic leveling device and an improved bearing for supporting the same, means being provided relative to said bearing for obtaining a rigid position of said leveling device when desired.

A still further object is to provide an instrument of the foregoing type which is constructed of but a few simple parts whereby it may be manufactured and placed upon the market at a minimum cost.

With the above and other objects in view, my invention relates to such details of construction and in the arrangements and combination of parts as will be hereinafter fully described and specifically pointed out in the appended claim.

In describing my invention in detail, reference will be had to the accompanying drawings wherein like characters denote like or corresponding parts throughout the several views, and in which:—

Figure 1 is a side elevation of a tripod showing my improved leveling device used in conjunction therewith; Fig. 2 is a sectional view of the device, taken on the line 2—2 of Fig. 1; Fig. 3 is a sectional view taken on the line 3—3 of Fig. 2, illustrating parts in elevation; Fig. 4 is a detail view of a bearing employed for supporting the leveling device and consequently rendering the same very delicate in operation; and Fig. 5 is a fragmentary view of a portion of the tripod illustrating the method of securing the sections thereof together.

Referring now more particularly to the drawings, wherein is illustrated the preferred embodiment of my invention, the numeral 10 designates the top portion of a tripod, which is preferably circular in form, as illustrated, and consisting of a pair of sections of relatively the same size. Means as shown at 11 are provided for securing the sections together, and consequently assuring their rigidity relative to the component structure.

Equidistant contingent lip portions 12 are provided up 1 the underside of the sections mentioned, which lip portion pivotally support, as shown at 13, pairs of parallel alined guide members 14, the lower extremities of the latter being held in spaced apart relation through the medium of binding elements 15 of obvious construction.

Standards 16 of suitable strength are employed, the upper portion of which is slidably mounted between the guilding members 14, while their lower extremities are provided with suitable feet portions 17, in order to prevent slipping when disposed upon the ground. When using a tripod of this construction upon rough and uneven ground, the operator thereof encounters considerable difficulty in adjusting the instrument thereon to a correct horizontal plane. In numerous instances it has been found impossible to adjust the measuring instrument under these conditions, and in view of the foregoing difficulties, I have provided the present device. This device is as set forth before automatic in operation and designed to quickly actuate the measuring instrument to a correct horizontal plane in order that it may be immediately rendered operative.

The leveling contrivance consists very essentially in the provision of a circular ball-shaped supporting element 18, which is movably supported in a bearing provided in the top portion 10 of the tripod. This bearing consists of semi-circular sections 19 provided at their inner edges with upper and lower curved flange 19', which flanges have their edge portions bent inwardly to form races 20. which receive the balls 21. It will be noted that the upper wall of the race is concave in form and the lower wall thereof is convex in form. After the supporting element 18 is secured in place between the sections of the bearing, it will be recognized that the same is movably supported and allowed to be actuated as presently mentioned. The ball-bearings 21 are designed to eliminate friction between the supporting element and bearing, consequently allowing the supporting element to be adjusted more quickly than would ordinarily be the case.

A rod 22 depends from the inside of the supporting element 18, the upper extremity of the former being in screw-threaded relation therewith in order to facilitate its removal and attachment. The rod 22 carries adjacent its lower extremities a weight 23, of the construction illustrated in Fig. 1, the weight being designed to act as an adjusting device by which the measuring instrument (not shown) may be adjusted. The weight will, under all circumstances, tend to seek the center of gravity, and of course actuate the supporting member 18 until it has reached the correct vertical position.

I have provided a suitable bracket upon the supporting member 18, for connection with any desired instrument, I not limiting myself to any specific instrument whatsoever. The bracket mentioned consists of a shank 24 projecting upwardly from the supporting element diametrically opposite the rod 22, the shank being bent at its upper extremity, as shown at 25 to form a horizontal supporting element 26. A fastening screw 27 is provided upon the supporting element in order to facilitate the attachment of the instrument thereto.

In the operation of my invention, the instrument to be employed is placed upon the supporting element 26 and secured in place through the medium of the fastening screw 27. The tripod is then set up in the usual manner, at any incline whatever. The weight 23 will of course seek its center of gravity and consequently adjust the measuring instrument to a correct horizontal plane and consequently allow the latter to be correctly actuated in the usual manner.

While the weight 23 is sufficient to move the instrument to a horizontal plane, I have provided a set screw 28 in conjunction with the bearing 19 for the purpose of engagement with the supporting element 18 and securing the same in a rigid position in relation to the component structure.

The advantages resultant from the use of my invention will be readily comprehended by those conversant with the crude and unsatisfactory devices heretofore provided in this art.

Such changes as are permissible by the subjoined claim may be resorted to without departing from the spirit of my invention.

Having thus fully described my invention, what I claim as new and desire to secure by Letters Patent is:—

In a device of the character described, a tripod, vertical, adjustable means supporting said tripod, a sectional bearing carried thereby, said bearing having races provided upon its inner face, said races receiving bearing balls, a ball-shaped supporting element carried by said bearing, a flange projecting upwardly from said element, a rod depending from said element, said rod being arranged diametrically opposite said bracket, said rod carrying a weight, and a set screw passing through one of said sections and engaging said element whereby said element may be held in rigid relation to said tripod.

ALBERT H. OLESBERG.

Witnesses:
J. GORDON HILL.
E. S. GOURLIE.